(12) United States Patent
Scott

(10) Patent No.: US 7,389,315 B1
(45) Date of Patent: Jun. 17, 2008

(54) SYSTEM AND METHOD FOR BYTE SWAPPING FILE ACCESS DATA STRUCTURES

(75) Inventor: John A. Scott, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 426 days.

(21) Appl. No.: 10/086,785

(22) Filed: Feb. 28, 2002

(51) Int. Cl.
*G06F 17/30* (2006.01)
(52) U.S. Cl. .................. 707/205; 707/101; 707/10; 707/6
(58) Field of Classification Search .......... 707/1–4, 707/8–10, 100, 101, 104.1, 200–205, 246, 707/206, 6; 709/200–205, 217–219, 227–229; 710/1, 22, 62, 65, 100; 711/100, 101, 111, 711/112, 154; 341/51
See application file for complete search history.

(56) References Cited

U.S. PATENT DOCUMENTS

| | | | |
|---|---|---|---|
| 5,163,131 A | | 11/1992 | Row et al. |
| 5,355,453 A | | 10/1994 | Row et al. |
| 5,438,674 A | * | 8/1995 | Keele et al. ............. 711/4 |
| 5,485,579 A | | 1/1996 | Hitz et al. |
| 5,727,218 A | * | 3/1998 | Hotchkin ............. 710/260 |
| 5,758,174 A | * | 5/1998 | Crump et al. ............. 713/323 |
| 5,761,680 A | * | 6/1998 | Cohen et al. ............. 707/206 |
| 5,802,366 A | | 9/1998 | Row et al. |
| 5,809,328 A | * | 9/1998 | Nogales et al. ............. 710/5 |
| 5,819,292 A | | 10/1998 | Hitz et al. |
| 5,867,690 A | * | 2/1999 | Lee et al. ............. 710/65 |
| 5,926,642 A | * | 7/1999 | Favor ............. 712/1 |
| 5,931,918 A | | 8/1999 | Row et al. |
| 5,941,972 A | | 8/1999 | Hoese et al. |
| 5,963,962 A | | 10/1999 | Hitz et al. |
| 6,065,037 A | | 5/2000 | Hitz et al. |
| 6,067,595 A | * | 5/2000 | Lindenstruth ............. 710/307 |
| 6,282,537 B1 | * | 8/2001 | Madnick et al. ............. 707/4 |
| 6,289,356 B1 | | 9/2001 | Hitz et al. |
| 6,321,310 B1 | * | 11/2001 | McCarthy et al. ............. 711/154 |
| 6,388,586 B1 | * | 5/2002 | Fischer et al. ............. 341/51 |
| 6,425,035 B2 | | 7/2002 | Hoese et al. |
| 6,434,568 B1 | * | 8/2002 | Bowman-Amuah ..... 707/103 R |
| 6,665,746 B1 | * | 12/2003 | Liong ............. 710/22 |
| 6,745,310 B2 | * | 6/2004 | Chow et al. ............. 707/2 |
| 6,865,614 B2 | * | 3/2005 | Fischer et al. ............. 709/246 |

OTHER PUBLICATIONS

Virtual Interface Architecture Specification, Version 1.0, Compaq Computer Corp., Intel. Corp., and Microsoft, Corp., Dec. 1996.

(Continued)

*Primary Examiner*—Jean M Corrielus
(74) *Attorney, Agent, or Firm*—Cesari and McKenna, LLP

(57) ABSTRACT

A system and method for byte swapping file access data structures is provided. A file server, upon receipt of a file access data structure, byte swaps the header of the data structure and passes the data structure to the appropriate file access system process to process the operation defined by the data structure. The file access system process calls a byte swapping engine to perform byte swapping on individual elements of the data structure as needed. The byte swapping engine utilizes a descriptor look up table to determine what action should be performed on each element of a data structure.

24 Claims, 9 Drawing Sheets

OTHER PUBLICATIONS

DAFS: Direct Access File System Protocol, Version 1.0, DAFS Collaborative, Sep. 2001.

Virtual Interface Architecture Specification, Version 1.0, published in collaboration between Compaq Computer Corporation, Intel Corporation and Microsoft Corporation, Version 1, Dec. 16, 1997.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

* cited by examiner

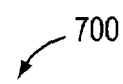

|   | A | B | C |
|---|---|---|---|
| 705 | UINT 32 | CONVERT | USE_CHECKSUMS |
| 710 | UINT 32 | CONVERT | USE_RESPONSE_CACHE |
| 715 | UINT 32 | CONVERT | MAX_CREDENTIALS |
| 720 | UINT 32 | CONVERT | MAX_REQUEST_SIZE |
| 725 | UINT 32 | CONVERT | MAX_RESPONSE_SIZE |
| 730 | UINT 32 | CONVERT | MAX_REQUESTS |
| 735 | UINT 32 | CONVERT | INLINE_WRITE_HEADER_SIZE |
| 740 | UINT 32 | CONVERT | USE_BACK_CONTROL_CHANNEL |
| 745 | UINT 32 | CONVERT | USE_RDMA_READ_CHANNEL |
| 750 | DAFS_UTF8STRING | CONVERT | FENCE_ID_STRING |
| 755 | DAFS_VAR_OFFSET_TYPE | CONVERT/LINKED | CLIENT_ID_STRING |
| 760 | DAFS_VERIFIER_TYPE | COPY | CLIENT_VERIFIER |
| 765 | ENTRY TERMINATOR | | |

FIG. 7

SYSTEM AND METHOD FOR BYTE SWAPPING FILE ACCESS DATA STRUCTURES

FIELD OF THE INVENTION

The present invention pertains to file servers and more particularly to converting file access data structures to a proper endian format.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

As used herein, the term "storage operating system" generally refers to the computer-executable code operable on a storage system that manages data access requests and may implement file system semantics in implementations involving file servers. In this sense, the Data ONTAP™ storage operating system, available from Network Appliance, Inc. of Sunnyvale, Calif., which implements a Write Anywhere File Layout (WAFL™) file system, is an example of such a storage operating system implemented as a microkernel. The storage operating system can also be an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity) partitions in a single disk) arranged according to a RAID 4, or equivalent high-reliability, implementation.

Computer and file server architectures differ in their method of storing a sequence of bytes in computer memory. Each byte traditionally carries 8 bits of information. However, to store and process larger numbers, for example, 16-bit or 32-bit quantities, microprocessors and computers store a sequence of bytes together to produce a desired-sized number. The two most common methods of storing these multi-byte sequences are termed "big endian" and "little endian". In a big-endian computer, the most significant value in the sequence is stored first. Conversely, in a little-endian computer, the least significant value is stored first. The least significant value is a byte of a sequence that represents the smallest quantity. For example, given the two-byte hexadecimal number 4F52, the least significant byte is the "52" byte.

With regard to storing these multi-byte sequences, "first" means the lowest storage address. For example, given the two byte hexadecimal number 4F52, a big-endian computer would store this number in memory as 4F52. If, for example, the "4F" byte was stored at memory address 1000, the "52" byte would be stored at memory address 1001. Conversely, in a little-endian computer, this number would be stored as 524F, with the "52" byte stored at memory address 1000 and the "4F" byte stored at memory address 1001.

In both big and little-endian computers, the bits within each byte are traditionally stored in big-endian format. While it is possible to have a little-endian bit order, most conventional central processing units and microprocessors are currently designed for a big-endian bit order.

The endianness of a particular computer or filer server is particularly relevant when that computer is exchanging specific types of data with a computer or file server of a differing endianness. By "endianness" it is meant the byte order that a particular computer, file server or network device utilizes, for example big or little-endian. Many data transfer protocols and file formats of a set endianness for use with a computer performing any translations as needed. However occasions do arise when a computer needs to know the endianness of another computer. One example of this is a use of remote direct memory access (RDMA) through certain communication links such as a virtual interface (VI) connection. Remote direct memory access enables data to be passed between storage and memory over a network with little host processor intervention. The term "virtual interface" refers to an industry-standard interface between high performance network hardware and computer systems. The architecture for the virtual interface (VI) is defined in *VIRTUAL INTERFACE ARCHITECTURE SPECIFICATION, VERSION* 1.0, published in collaboration between Compaq Computer Corporation, Intel Corporation and Microsoft Corporation, which is hereby incorporated by reference. To use the RDMA read/write capabilities implemented under the VI architecture, the source computer must supply to the VI interface the source of the data to be transferred and the destination address on the remote computer for the data. Under the VI architecture specification, this remote address must be organized in the proper endianness of the remote computer. In a homogeneous networking environment, where all computers involved share the same endianness this requirement is easily met. However, a need arises to determine the proper endianness of the computer to which a different computer is connected when all the computers in a given network do not share the same endianness. One technique for determining the endianness a computer connected to another computer via a VI connection is described in U.S. patent application Ser. No. 10/061,626 filed on Feb. 1, 2002, by Philip J. Christopher entitled SYSTEM AND METHOD FOR USING AN ENDIAN-NEUTRAL DATA PACKET TO DEFINE SUBSEQUENT DATA PACKET BYTE-ORDER, which is hereby incorporated by reference.

The Direct Access File System (DAFS) is a file access and management protocol designed for local file sharing or clustered environments. The primary goal of DAFS is to provide clients with high-speed file and system access with the lowest possible cost for the client. DAFS is defined in *DAFS: Direct Access File System Protocol, Version* 1.0, by Network Appliance, dated Sep. 1, 2001, the contents of which are hereby incorporated by reference. The DAFS protocol takes advantage of system and networks that provide Direct Access Transport (DAT) capabilities that allow for direct memory to memory data transfer. DAT includes, inter alia, the capability of direct memory to memory data transfers such as remote direct memory access (RDMA). The above-incorporated DAFS protocol defines file access operations that use remote memory-to-memory copying other high-performance data transport operations supported by DAT, including the use of RDMA over Direct Access Transport systems, such as a VI connection or over an InfiniBand Trade Association's InfiniBand™ network. RDMA capabilities are incorporated into a VI implementation. A Virtual Interface Provider Library (VIPL), which implements VI on a computer, includes dual commands for many operations, including a traditional inline data movement command and a RDMA data movement command. The inline data movement commands execute by breaking a block of data to be transferred into appropriate sized packets and transmitting the packets over the network connection. The RDMA variants of the data movement commands utilize the RDMA capabilities of VI to more efficiently move larger blocks of data from computer to computer.

Under the DAFS protocol, packets that are exchanged between clients and servers are defined as discrete structures instead of being-stream encoded. For example, the structures are sequences of data elements that can be of varying sizes. As an additional technique to reduce the processing cost to the client, the DAFS protocol requires that multi-byte data elements are encoded using a client-specified byte order, which is presumed to be native to the client. Thus, multi-byte data elements sent in by the server to the client must be converted to this client-specified byte order.

In known byte-swapping implementations, each data structure or function utilizes a specifically coded byte-swapping routine. Such byte-swapping routines may be implemented in either hardware or software. A noted disadvantage of the use of a set of specifically coded functions for byte swapping is the amount of storage required for the various routines. As each data structure has an associated routine, the storage space required to hold the various byte-swapping routines increases with the number of data structures that could be byte swapped. Additionally, the use of specifically coded and static functions to perform byte swapping does not permit easy modifications to the swapping routines should a change in the data structures occur.

SUMMARY OF THE INVENTION

This invention overcomes the disadvantages of the prior art by providing a system and method for byte swapping file access data structures from a first endianness to a second endianness. The system and method first determines if a file access data structure contains certain characteristics. If the file access data structure contains one of these specific characteristics, the data structure is processed by a processing path using static programming techniques. These statically programmed techniques enable certain critical path or small data structures to be programmed more efficiently.

If the data structure is not one of the specific types to be processed using static programming techniques, the data structure is processed by a second processing path using a byte swapping engine located within a storage operating system executing on a computer. The byte-swapping engine utilizes a descriptor look-up table, which provides descriptions of the size of and action to be performed on each element of a file access data structure. The descriptor look-up table may also be nested by containing links to other descriptor tables within the descriptor look-up table. The byte-swapping engine works by stepping through the descriptor table and processing the elements of the desired data structure according to the element's size and action specified within the descriptor look-up table. The byte-swapping engine may be recursively called for nested entries of a file access data structure. By utilizing a table, wide variation in data structures can be accommodated and updates to data structures can be accomplished by modifying table entries.

Within a storage operating system, the byte-swapping engine may be called by various processes to translate a data structure into a proper endianness. The calling process places the data structure in an input buffer and then calls the byte-swapping engine. After the byte-swapping engine has performed the actions described in the descriptor look-up table, the byte-swapped data structure is placed in an output buffer. The calling process can then access the byte-swapped data structure from the output buffer for further processing.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 7 is a block diagram of an exemplary entry of descriptor cable from FIG. 6 in accordance with an embodiment of this invention;

DETAILED DESCRIPTION OF AN ILLUSTRATIVE EMBODIMENT

A. Network Environment

Figure 1:
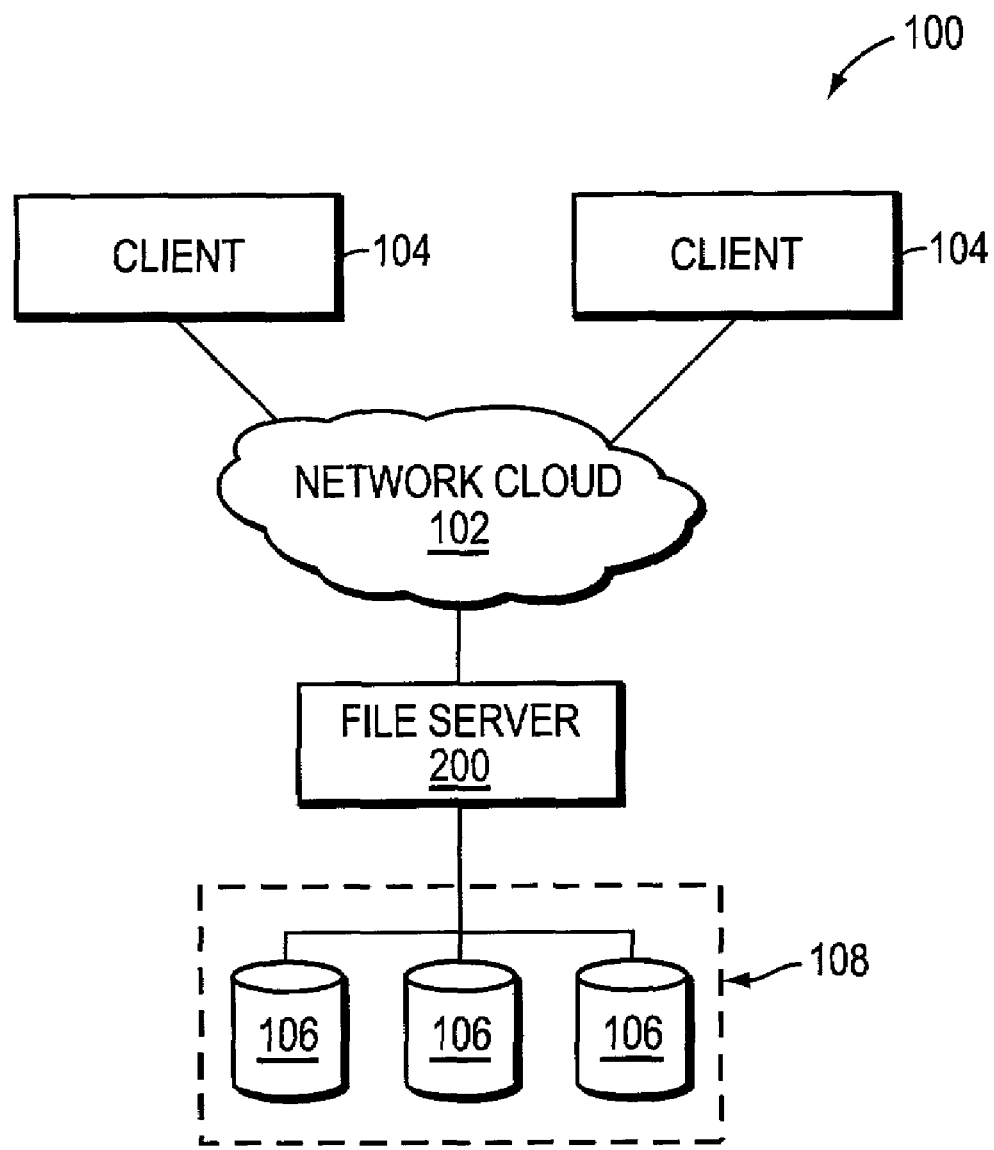
FIG. 1 is a schematic block diagram with an exemplary network environment in which the principles of the present invention can be practiced.

FIG. 1 is a schematic block diagram of an exemplary network environment 100 in which the principles of the present invention are implemented. A network 100 is based around a network cloud 102. This network cloud can be a local or network (LAN), a wide area network (WAN), virtual private network (VPN) utilizing communication links over the internet, for example, or a combination of LAN, WAN and VPN implementations can be established. For the purposes of this description, the term network cloud should taken broadly to include any acceptable network architecture. The network cloud 102 interconnects various clients 104. Also attached to the network cloud is a file server 200. This file server, described further below is configured to control storage of, and access to, data and a set 108 of interconnected storage volumes 106. Each of the devices attached to the network cloud include an appropriate conventional network interface arrangement (not shown) for communicating over the network cloud using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

B. File Servers

Figure 2:
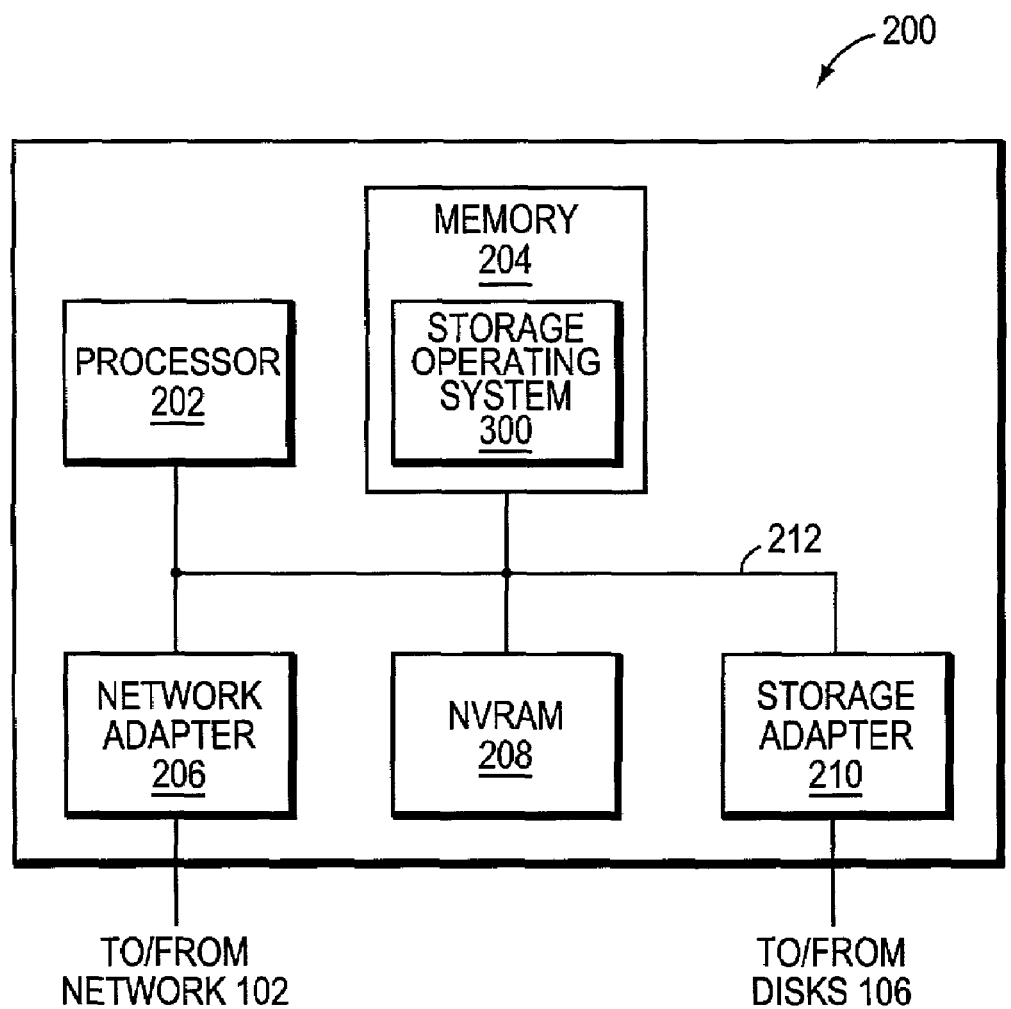
FIG. 2 is a more-detailed schematic block diagram of a file server in accordance with the embodiment of this invention.
Figure 3:
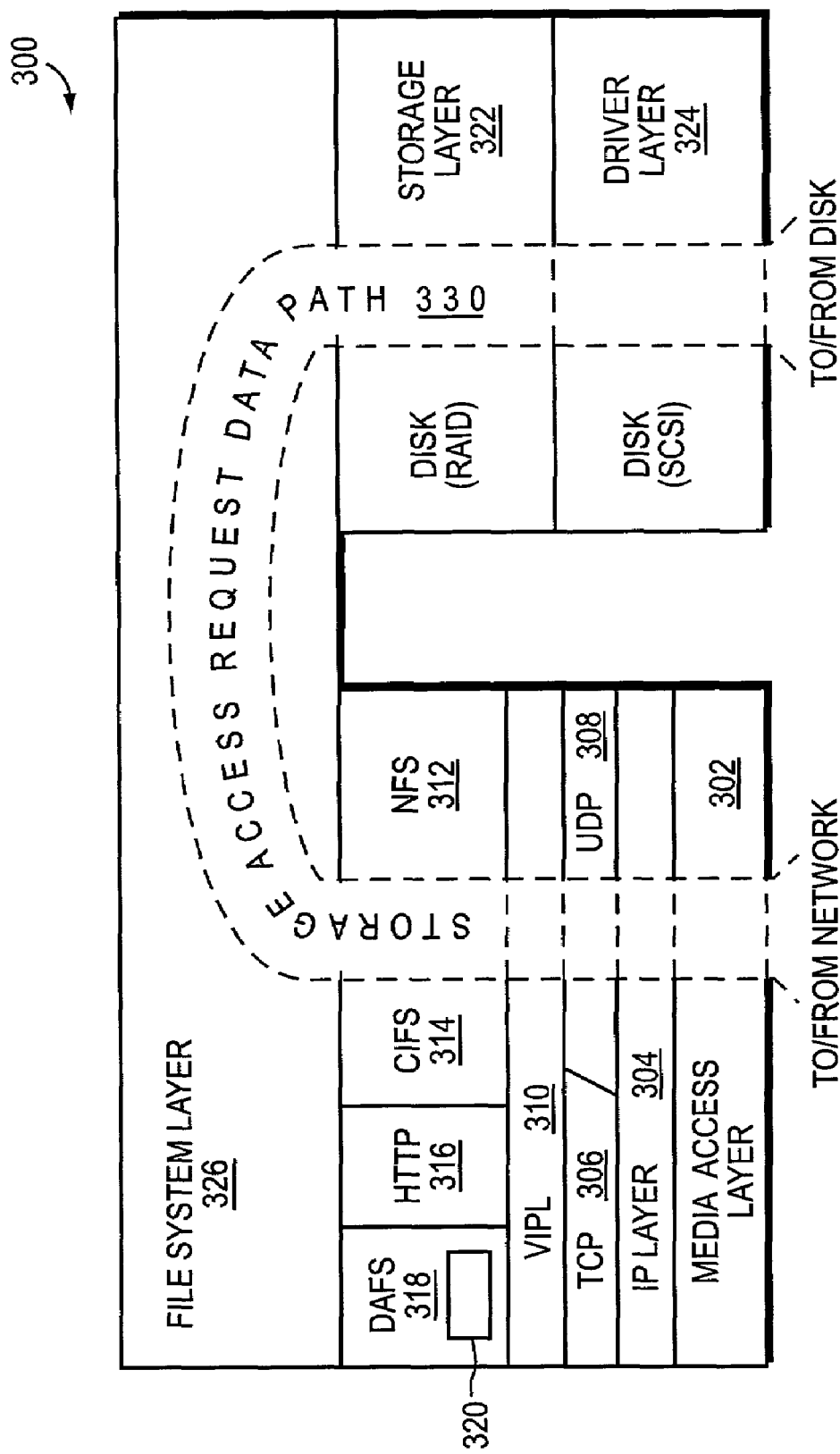
FIG. 3 is a schematic block diagram of an exemplary storage operating system for use with the file server of FIG. 2 in accordance with an embodiment of this invention.

FIG. 2 is a more-detailed schematic block diagram of an exemplary file server 200. By way of background, a file server or filer, is a computer that provides file service relating to the organization of information on storage devices, such as disks. However, it will be understood by those skilled in the art that the inventive concepts described here may apply to any type of file server, whether implemented as a special-purpose or general-purpose computer, including a stand alone computer.

The file server 200 comprises a processor 202, in memory 204, in network adapter 206, a nonvolatile random access memory (NVRAM) 208 in the storage adapter 210 interconnected by system bus 212. Contained within the memory 204 is a storage operating system 300 that may implement a file system to logically organize the information as a hierarchical structure of directories and files on the disks. In the illustrative embodiment, the memory 204 comprises storage locations that are addressable by the processor and adapters for storing software program code. The operating system 300, portions of which are typically resident in memory and executed by the processing elements, functionally organizes the filer by inter alia, invoking storage operations in support of a file service implemented by the file server.

The network adapter 206 comprises a mechanical, electrical and signaling circuitry needed to connect the file server 200 to client 104 over network cloud 102. The client 104 maybe a general-purpose computer configured to execute applications, such as data base applications. Moreover, the client 104 may interact with the filer server 200 in accordance with the client/server model of information delivery. That is, the client may request the services of the file server, and the file server may return the results of the services requested by the client, by exchanging packets defined by an appropriate networking protocol.

The storage adapter 210 incorporates with the storage operating system 300 executing on the file server to access information requested by the client. Information maybe stored on the disks 106 of a disk 108 (FIG. 1) that is attached via the storage adapter 210 to the file server. The storage adapter 210 includes input/output (I/O) interface circuitry that couples to the disks over in I/O interconnect arrangement, such as a conventional high-performance Fibre Channel serial link topology. The information is retrieved by the storage adapter and, if necessary, processed by the processor 202 (or the adapter 210 itself) prior to be forwarded over the system bus 212 to the network adapter 206, where information is formatted into appropriate packets and returned to the client 104.

In one exemplary file server implementation, the file server can include a non-volatile random access memory (NVRAM) 208 that provides fault-tolerant backup of data, enabling the integrity of filer server transactions to survive a service interruption based upon a power failure, or other fault.

C. Storage Operating System

To facilitate the generalized access to the disks 106 on the array 108, the storage operating system 300 implements write-anywhere file system that logically organizes the information as a hierarchical structure of directories and files on the disks. Each "on-disk" file may be implemented as a set of disks blocks configured to store information, such as data, whereas the directory may be implemented as a specially formatted file which other files and directories are stored. As noted above, in the illustrative embodiment described herein, the operating system is the NetApp® Data ONTAP™ operating system available from Network Appliance, Inc., that implements the write-anywhere file layout (WAFL™) file system. It is expressly contemplated that any appropriate file system can be used, and as such, where the term WAFL or file system is employed, it should be taken broadly to refer to any file system that is otherwise adaptable to the teachings of this invention.

The storage operating system comprises a series of software layers, including a media access layer 302 of network drivers (e.g., an Ethernet driver). The storage operating system 300 further includes network protocol layers, such as an Internet Protocol (IP) layer 304 and its supporting transport mechanisms, the Transport Control Protocol (TCP) layer 306 and the User Datagram Protocol (UDP) layer 308. Additionally the storage operating system includes a virtual interface provider layer (VIPL) 310, which implements the virtual interface architecture.

This VIPL layer 310 provides the direct access transport capabilities required by the Direct Access File System. The requirements of a direct access transport (DAT) for use by the Direct Access File System are described in the above-incorporated DAFS specification. Generally, a DAT should support remote direct memory access (RDMA) and be capable of transmitting variable-sized data blocks. As such, the VIPL layer 310 should be taken as exemplary only. Any other suitable transport protocol that can accommodate the DAFS protocol can be utilized including, for example, Infini-Band™. A file system protocol layer provides multi-protocol data access and, to that end, includes support for the Network File System (NFS) protocol 312, the Common Internet File System (CIFS) protocol 314, the Hyper Text Transfer Protocol (HTTP) 316 and the Direct Access File System (DAFS) protocol 318. In addition, the storage operating system 300 includes a disk storage layer 322 that implements a disk storage protocol, such as a RAID protocol, and a disk driver layer 324 that implements a disk access protocol such as, e.g., a Small Computer System Interface (SCSI) protocol.

Bridging the disk software layers with the network and file system protocol layers is a file system layer 326 of the storage operating system 300. Generally the file system layer 326 implements a file system having an on-disk format representation that is block-based using, e.g., 4-kilobyte (KB) data blocks and using inodes to describe the files. In response to transaction requests, the file system generates operations to load (retrieve) the requested data from volumes 134 if it is not resident "in-core", i.e., in the filer's memory 124. If the information is not in memory, the file system layer 280 indexes into the inode file using the inode number to access an appropriate entry and retrieve a logical volume block number. The file system layer 280 then passes the logical volume block number to the disk storage (RAID) layer 224, which maps that logical number to a disk block number and sends the latter to an appropriate driver (for example, an encapsulation of SCSI implemented on a fibre channel disk interconnection)

of the disk driver layer 226. The disk driver accesses the disk block number from volumes 134 and loads the requested data in memory 124 for processing by the filer 120. Upon completion of the request, the filer (and storage operating system) returns a reply, e.g., a conventional acknowledgement packet defined by the CIFS specification, to the client 110 over the network 140.

It should be noted that the storage access request data path 330 through storage operating system layers described above needed to perform data storage access for the client requests received by the file server may alternately be implemented in hardware, software or a combination of hardware and software. That is, in an alternative embodiment of this invention, the storage access request data path 330 may be implemented as logic circuitry embodied within a field programmable gate array (FPGA) or in an application specific integrated circuit (ASIC). This type of hardware implementation increases the performance of the file service provided by the file server 200 in response to a file system request issued by a client.

Additionally, within the DAFS layer 318, a discriminator look up table 320 and a byte swapping engine are provided. This discriminator look up table 320, described further below, is utilized by the a byte swapping engine, also described below, for ensuring that DAFS data structures are in the proper endianness.

D. File Access System Structure Byte Swapping

Figure 4:
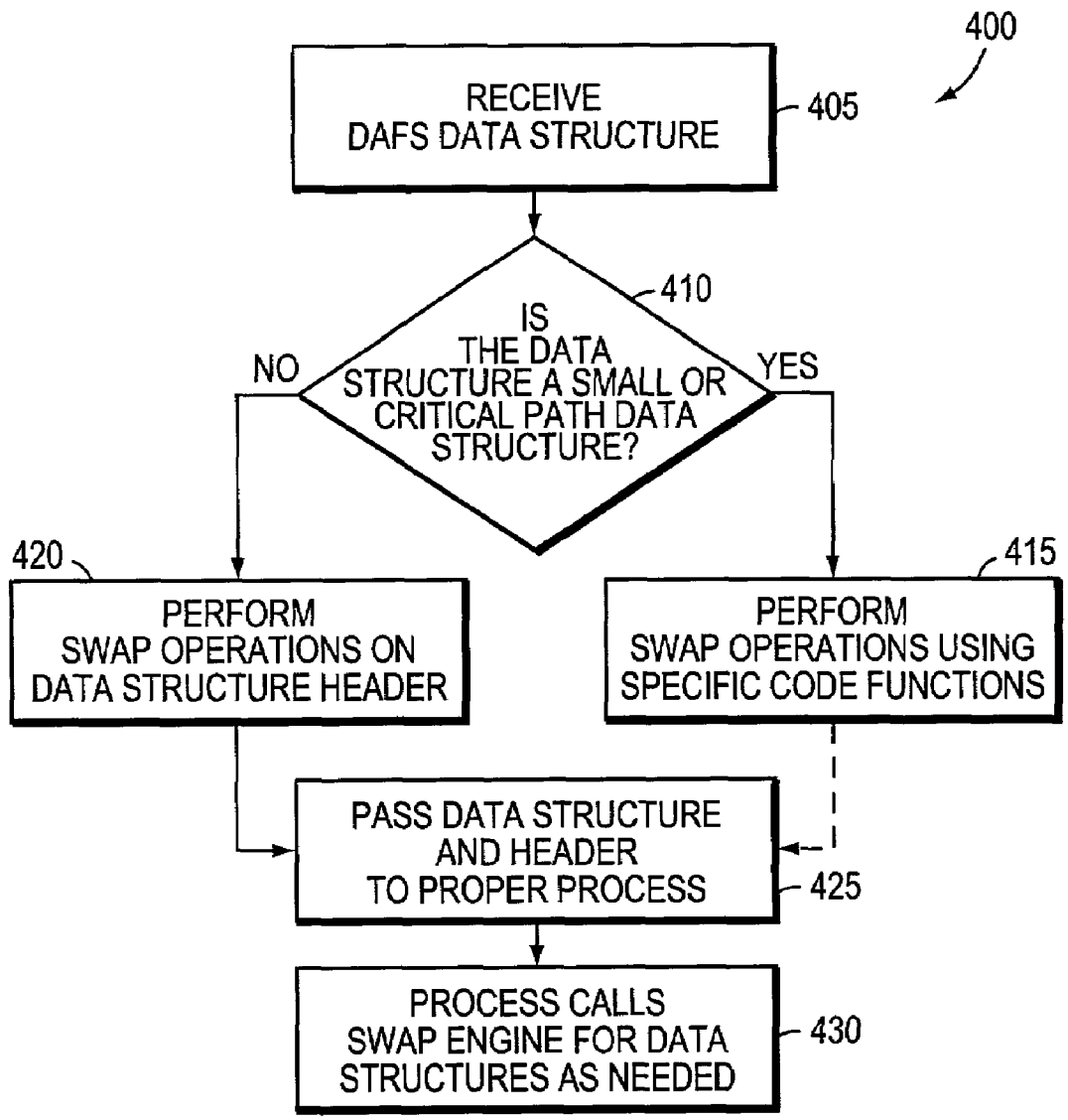
FIG. 4 is a flow chart detailing the procedure of performing byte swapping on DAFS data structures in accordance with an embodiment of this invention.

FIG. 4 is a flow chart detailing the process that the DAFS layer 318 performs upon receipt of a file access data structure, such as a DAFS data structure, from a client. By "file access data structure" it is meant data structures associated with structure-based networking or file access protocols, such as the Direct Access File System, CIFS or NFS or other protocols in which packets are sent/received in non-native byte order. File access data structures do not include the various data structures associated with stream-based data such as that utilized by the Hypertext Transport Protocol (HTTP). In step 405 the client receives the DAFS data structure. This receipt is accomplished via known data transfer techniques such as virtual interface data connections. Next, in decision step 410, a determination is made whether the data structure received is a small or critical path data structure. By "small" it is meant a data structure that does not have many variable sized or large elements to be converted. The definition of "small" is very flexible. In various alternate embodiments, all data structures could be deemed to be small and have a specific routine written for their processing. The term "critical path data structures", as used herein, is defined as commonly utilized data structures. For example, the DAFS header data structure is a critical path data structure as it is utilized many times during the course of a network session. If the DAFS data structure received is a small or critical path data structure, the structure is byte swapped using specific code functions designed for that given data structure in step 415.

These specific code functions are designed to rapidly convert any elements of the data structure to the appropriate endianness without the need for the processing overhead inherent with the use of the byte swapping engine described further below. By not invoking the byte swapping engine, substantial processing power and time could be saved. These small or critical path data structures are byte swapped using hard coded functions. By utilizing hard coded, specific functions, these data structures are processed faster than by the use of the byte swapping engine described below. These hard coded, specific functions can be implemented in either hardware, firmware, software or a combination of hardware, software and/or firmware.

If the data structure is not a small or critical path data structure, the DAFS layer then performs any required byte swapping operation on the data structure header in step 420. Note that, this byte swapping of the data structure header can be, in alternate embodiments, performed by specific hard-coded functions and not by the byte swapping engine. The byte swapped data structure header and data structure is then passed to the proper process within the DAFS server. The data structure is passed to the DAFS process that executes the particular command associated with a given data structure. For example, if a DAFS_PROC_WRITE_INLINE command is part of the data structure to be processed, after performing the appropriate byte swapping on the DAFS header structure, the processed header and the data structure containing the arguments for the DAFS_PROC_WRITE_INLINE command are then passed to the appropriate process within the DAFS layer that executes inline write commands. In step 430, the process handling the execution of the data structure calls the byte swapping engine to process specific elements of the data structure as needed. Thus, in the example of a DAFS_PROC_WRITE_INLINE call, the inline writing process would call the byte swapping engine to perform the appropriate byte swapping on such elements as, for example, the byte_count field of the DAFS_Write_Inline_Args data structure.

Figure 5:
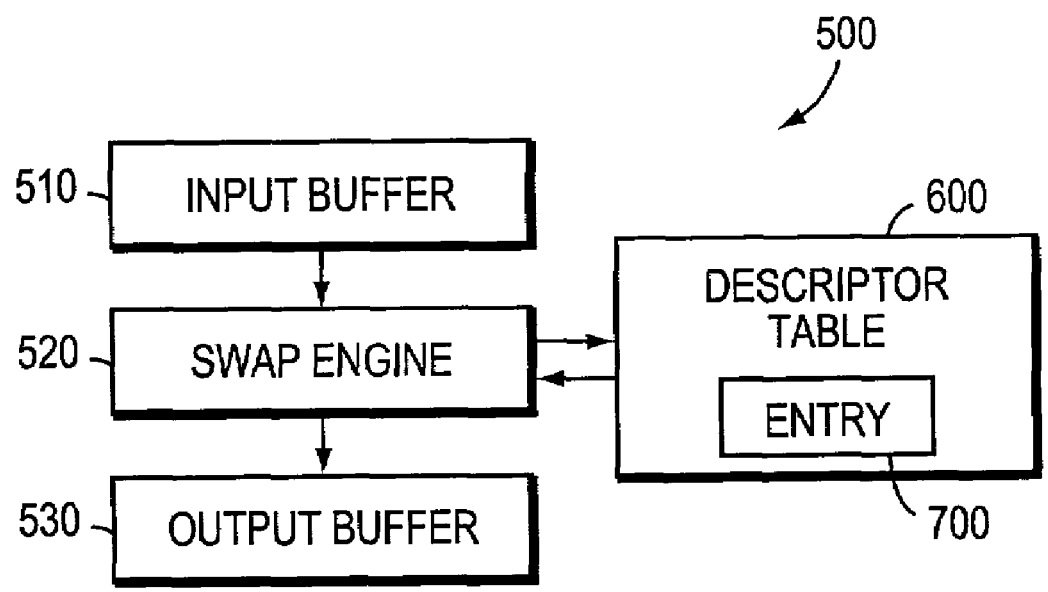
FIG. 5 is a schematic block diagram of an exemplary byte swapping engine in accordance with an embodiment of this invention.

FIG. 5 is an exemplary block diagram of the byte swapping engine and associated buffers and tables. The input buffer 510 stores the DAFS data structure to be processed by the byte swapping engine. The process within the DAFS layer that the byte swapping engine places, the file access data structure to be byte swapped in the input buffer. The byte swapping engine (BSE) 520, described further below, interfaces with both the input buffer 510 and the output buffer 530, in addition to a descriptor look up table 600. Once the DAFS data structure to be byte swapped has been operated upon by the byte swapping engine 520 the results are placed in the output buffer 530 to be retrieved by the process that called the byte swapping engine. The descriptor table 600 and associated entries 700, described further below, contain descriptions of each of the DAFS data structures and an associated operation to be performed on each element of the DAFS data structure when the data structure is operated on by the byte swapping engine.

Figure 6:
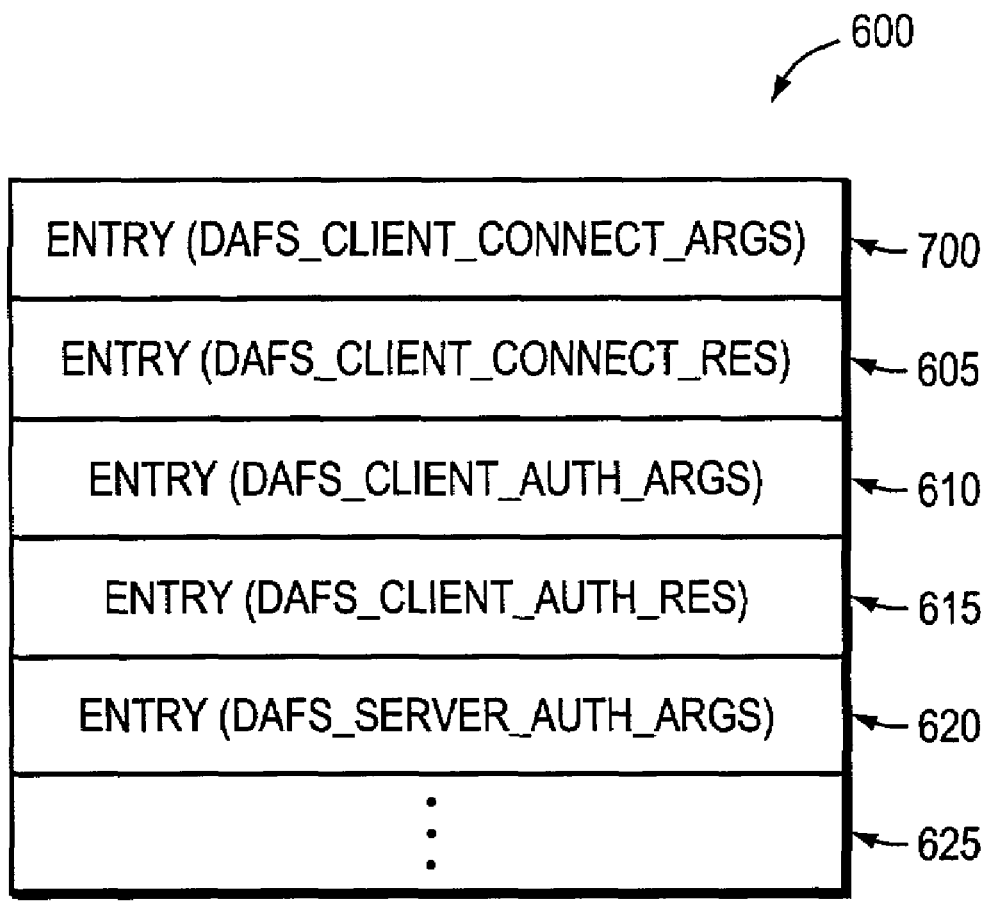
FIG. 6 is a schematic block diagram of an exemplary descriptor table of FIG. 5 in accordance with an embodiment of this invention.

FIG. 6 is a exemplary descriptor look up table 600 containing a plurality of entries 700, 605, 610, 615, 620 and 625. In this illustrative descriptor look up table, entry 700 is associated with the DAFS_Client_Connect_Args data structure (see FIG. 7). Similarly, entry 605 contains the description for the DAFS_Client_Connect_Res data structure, and entry 610 contains the description for the DAFS_Client_Auth_Args data structure. In the illustrative embodiment, the descriptor look up table 600 includes an entry for each DAFS data structure except those data structures that have dedicated, specific byte swapping routines such as, e.g., small or critical path data structures.

FIG. 7 is an exemplary entry 700 of the discriminator look up table 600 describing the DAFS_Client_Connect_Args data structure. The entry 700 includes elements 705-770 divided into three columns. The first column (A) identifies the size of the element, the second column (B) defines the type of operation to be performed on the element of the DAFS data structure, and the third column (C) describes the name of that element within the DAFS data structure. Element 765 is as an entry terminator to define the end of the entry 700. It should be noted that, in alternative embodiments, the third column, column C, which contains the name of the element contained within the entry, is not part of the actual table entry 700. It is shown here for exemplary and illustrative purposes only.

As can be seen from the entry 700, the first nine elements 705-745 of the DAFS_Client_Connect_Args data structure have a size of UINT32 (from column A) and the operation to be performed is CONVERT (column B). The UINT32 is defined in the DAFS specification as an unsigned thirty-two bit integer value. The CONVERT operation identifier means that the byte swapping engine needs to convert that particular entry into the proper endianness. Other possible entries include, for example, COPY, which causes the byte swapping engine to simply copy the data and not to perform any byte swapping, and LINKED, which alerts the byte swapping engine that this entry is a linked or nested data structure. Linked data structures can also include additional linked data structures. Thus, to be complete the byte-swapping of a data structure, several levels of nested data structures may need to be operated upon. For nested data structures, the byte swapping engine will look up the appropriate descriptor table entry defining the nested element and perform the appropriate actions as defined in that table entry on the nested data structure.

Entry 750, for the client_id_string element of the DAFS_Client_Connect_Args data structure, also states that this element is to be converted. The client_id_string (element 755) of type DAFS_VAR_OFFSET_TYPE is a variable length and nested element. The operation to be performed is CONVERT|LINKED, which alerts the byte swapping engine that this is a nested element that needs to be converted. The "|" operator identifies that there are two or more commands to be executed on a given element. Finally, the client_verifier element 760 should be copied by the byte swapping engine.

Figure 8:
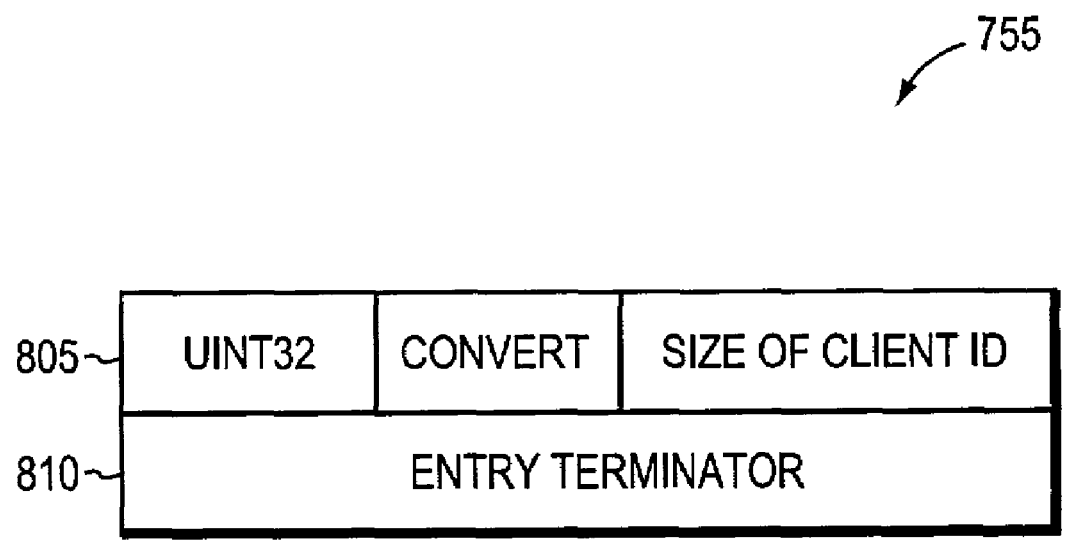
FIG. 8 is a block diagram of an exemplary nested data structure of FIG. 7.

FIG. 8 is a block diagram of exemplary nested data structure client_id_string (element 755 of FIG. 7). The nested data structure includes element 805, which should be converted by the byte swapping engine.

Figure 9:
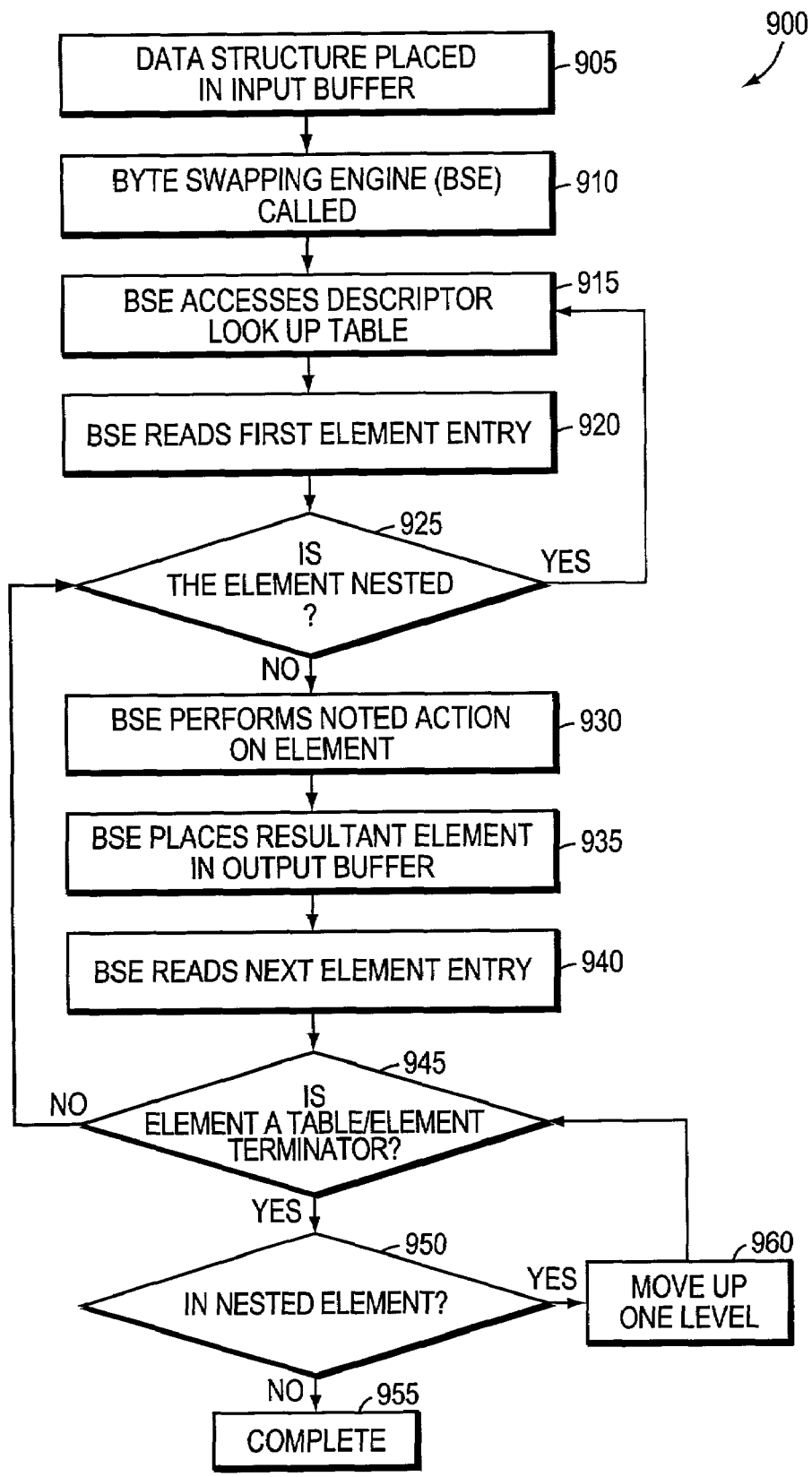
FIG. 9 is a flow chart of the procedure performed by the byte swapping engine in accordance with this invention.

FIG. 9 is a flowchart detailing the process 900 of byte swapping performed by the byte swapping engine in accordance with an embodiment of this invention. The data structure to be byte swapped is first placed in the input buffer in step 905. The byte swapping engine is then called (step 910). The byte swapping engine accesses the descriptor table entry describing the particular data structure to be processed. Then, in step 920, the byte swapping engine reads the first element entry of the descriptor table entry. The byte swapping engine determines whether this element is a nested element (decision step 925). If the element is nested, the byte swapping engine accesses the descriptor look up table for the entry corresponding to the nested entry (branch back to step 915). The byte swapping engine then proceeds as described for this nested entry.

If the element is not a nested element, the byte-swapping engine performs the action noted in the descriptor look up table for the given element (step 930). This specified action, contained in the descriptor look-up table, can be either a copy or a conversion of the data stored in the specific element of the data structure. By utilizing the descriptor look-up table, the byte-swapping engine can accommodate variable sized data structures and can be easily modified to accommodate revised data structures. Should a change occur to the underlying data structure definitions, only the use the descriptor look-up table would need to be modified for the byte-swapping engine to properly process the various data structures.

After performing the designated action, the byte swapping engine places the processed element in the output buffer (step 935). After placing the processed element in the output buffer, the byte swapping engine then reads the next element entry from the descriptor table (step 940). If the element is not a terminator (step 945), the procedure loops to step 925 and continues. If the next element is a terminator, the byte swapping engine determines if it is currently processing a nested element in step 950. If the byte swapping engine is not processing a nested element, the byte swapping engine has completed the processing of the data structure (step 955). Otherwise, the byte swapping engine moves up one level from the current nested element and loops to step 940 where it reads the next element of the element one level up.

Upon completion of the processing, a processed version of the data structure is located in the output buffer, with the appropriate processing completed. Once the byte swapping engine completes, the process that originally called the byte swapping engine can then access the processed data structure in the output buffer to perform further processing as needed.

To again summarize, upon receipt of a file access data structure, the file system layer determines if the data structure is a small or critical path data structure. If the data structure is a small or critical data structure, the data structure is byte swapped using specific code functions. Otherwise only the header of the file access data structure is byte swapped. The data structure and header are then passed to the proper process within the file access system layer. Such various processes can call a byte swapping engine to byte swap data structures as needed. The data structure to the byte swapped is placed in the input buffer of the byte-swapping engine. The byte-swapping engine then accesses a descriptor look up table to identify the elements of the data structure. The byte-swapping engine then proceeds, element-by-element, through the file access data structure performing the indicated action on each element. The indicated action is contained in an entry of the descriptor look up table performing the indicated operations on. The byte-swapping engine will recursively move through nested elements, each element of a linked or nested element before returning to the parent element. As each operation is performed, the resulting element is placed in an output buffer. Once all of the elements of the file access data structure have been copied or byte swapped, the byte-swapping engine is completed. The calling process can then read or access the byte swapped file access data structure from the output buffer. In this manner, endianness differences between connected devices are corrected so that a structure-based environment such as DAFS is fully supported.

The foregoing has been a detailed description of illustrative embodiments of the invention. Various modifications and additions can be made without departing from the spirit and scope of the invention. It should also be noted that alternate forms of data access ports, other than VI discriminators, can be utilized in accordance with the teachings of this invention. While this description has been written with reference to the DAFS file access system and VI connections, it should be noted that any suitable file access system and appropriate transport protocol can be used in accordance with the teachings of this invention. It is expressly contemplated that any of the functions, procedures or processes described herein can be implemented using hardware, firmware or software, consisting of a computer-readable medium including program instructions executing on a computer, or a combination of hardware, firmware and/or software. Accordingly, this description is meant to be taken only by way of example and not to otherwise limit the scope of the invention.

What is claimed is:

1. A method for converting a file access data structure from a first endianness to a second endianness by a processor, comprising:

determining if the file access data structure is a critical path data structure, where the critical path data structure includes commonly utilized data structures;

in response to determining that the file access data structure is the critical path data structure, performing byte swap operations using specific code functions and placing a converted data structure in an output buffer to make the converted data structure available for further processing;

in response to determining that the file access data structure is not the critical path data structure, calling a byte-swapping engine to perform the following:

a.) identifying, from a descriptor look up table, a series of actions to perform on elements of the file access data structure;

b.) performing the identified series of actions on the elements of the file access data structure to convert the file data structure from the first endianness to the second endianness; and c.) placing a converted data structure in an output buffer to make the converted data structure available for further processing.

2. The method of claim 1, further comprising:

the critical path data structures are small data structures.

3. A method for converting a data structure by a processor, comprising:

determining if the data structure is a critical path data structure, where the critical path data structure includes commonly utilized data structures;

in response to determining that the data structure is the critical path data structure, performing byte swap operations using specific code functions and placing a converted data structure in an output buffer to make the converted data structure available for further processing;

in response to determining that the data structure is not the critical path data structure, calling a byte-swapping engine and performing the following:

a.) providing a file access data structure as input to the byte-swapping engine;

b.) providing a descriptor look up table to the byte-swapping engine;

c.) identifying, from the descriptor look up table, a series of actions to perform on elements of the file access data structure in order to swap bytes of the file access data structure from a first endianness to a second endianness;

d.) performing the identified series of actions on the elements of the file access data structure to convert the file access data structure; and e.) placing a converted data structure in an output buffer to make the converted data structure available for further processing.

4. The method as in claim 3, further comprising:

using as the file access data structure a file having Direct Access File System (DAFS) protocol.

5. The method as in claim 3, further comprising:

swapping bytes of the data structure as needed, in response to swapping bytes of the file access data structure.

6. The method as in claim 3, further comprising:

determining if an element entry of the descriptor look up table is nested;

branching to the nested entry;

identifying, from the descriptor look up table, a nested series of actions to perform on elements of the nested entry in order to swap bytes of the entry from a first endianness to a second endianness, where the nested series of actions includes linking and converting.

7. A method for converting a data structure by a processor, comprising:

determining if the data structure is a critical path data structure, where the critical path data structure includes commonly utilized data structures;

in response to determining that the data structure is a critical path data structure, performing byte swap operations using specific code functions and placing a converted data structure in an output buffer to make the converted data structure available for further processing;

in response to determining that the data structure is not the critical path data structure, calling a byte-swapping engine and performing the following:

a.) providing a file access data structure as input to the byte-swapping engine;

b.) providing a descriptor look up table to the byte-swapping engine;

c.) identifying, from the descriptor look up table, a series of actions to perform on elements of the file access data structure in order to swap bytes of the file access; and d.) performing the identified series of actions on the elements of the data structure header to convert the file access data structure; and e.) placing a converted data structure in an output buffer to make the converted data structure available for further processing.

8. A computer to convert a data structure by a processor, comprising:

means for determining if the data structure is a critical path data structure, where the critical path data structure includes commonly utilized data structures;

means for performing byte swap operations using specific code functions in response to determining that the data structure is the critical path data structure, and placing a converted data structure in an output buffer to make the converted data structure available for further processing;

means for calling a byte-swapping engine performing the following in response to determining that the data structure is not the critical path data structure:

a.) means for providing a file access data structure as input to the byte-swapping engine;

b.) means for providing a descriptor look up table to the byte-swapping engine; and c.) means for identifying, from the descriptor look up table, a series of actions to perform on elements of the file access data structure in order to swap bytes of the file access data structure from a first endianness to a second endianness; and d.) means for placing a converted data structure in an output buffer to make the converted data structure available for further processing.

9. A computer to convert a data structure by a processor, comprising:

means for determining if the data structure is a critical path data structure, where the critical path data structure includes commonly utilized data structures;

means for calling a byte swapping engine and performing the following in response to determining that the data structure is not the critical path data structure:

means for providing a file access data structure as input to the byte-swapping engine;

means for providing a descriptor look up table to the byte-swapping engine;

means for identifying, from the descriptor look up table, a series of actions to perform on elements of the data structure header in order to swap bytes of the file access data structure from a first endianness to a second endianness; and means for placing a converted data structure in an output buffer to make the converted data structure available for further processing.

10. The computer as in claim 9, further comprising:

means for swapping bytes of the data structure as needed, in response to swapping bytes of the file access data structure.

11. The computer as in claim 9, further comprising:

means for determining if an element entry of the descriptor look up table is nested;

means for branching to the nested entry; and means for identifying, from the descriptor look up table, a nested series of actions to perform on elements of the nested entry in order to swap bytes of the entry from a first endianness to a second endianness, where the nested series of actions includes converting and linking.

12. A computer readable medium, comprising:

a processor;

said computer readable medium containing instructions for execution on the processor for the practice of a method for converting a data structure, the method having the steps of, determining if the data structure is a critical path data structure, where the critical path data structure includes commonly utilized data structures;

in response to determining that the data structure is the critical path data structure, performing byte swap operations using specific code functions and placing a converted data structure in an output buffer to make the converted data structure available for further processing;

in response to determining that the data structure is not the critical path data structure, calling a byte-swapping engine and performing the following:
  a.) providing a file access data structure as input to the byte-swapping engine;
  b.) providing a descriptor look up table to the byte-swapping engine;
  c.) identifying, from the descriptor look up table, a series of actions to perform on elements of the file access data structure in order to swap bytes of the file access data structure from a first endianness to a second endianness;
  d.) performing the identified series of actions on the elements of the file access data structure to convert the file access data structure; and
  e.) placing a converted data structure in an output buffer to make the converted data structure available for further processing.

13. A method for converting a first data structure to a second data structure by a processor, the method comprising the steps of:

determining if the first data structure is a critical path data structure, where the critical path data structure includes commonly utilized data structures;

in response to determining that the first data structure is not the critical path data structure, calling a byte-swapping engine;

using a descriptor lookup table, by the byte-swapping engine, to provide actions to be performed on each element of the first data structure;

stepping through the descriptor table, by the byte-swapping engine, and processing each element of the first data structure according to the element's size and action to convert the first data structure having an element with a first endianness into the second data structure having an element with a second endianness; and placing the second data structure in an output buffer to make the second data structure available for further processing.

14. The method of claim 13, further comprising:

using a byte as the data structure.

15. The method of claim 13, further comprising:

determining if the first data structure is a critical path data structure, and if first data structure is a critical path data structure then converting an element of the first data structure from a first endianness to a second endianness using a set of specific code functions.

16. The method of claim 15, further comprising:

determining that the critical data path structure is a direct access file system (DAFS) header data structure.

17. The method of claim 15, further comprising:

designing the specific code functions to rapidly convert any elements of the data structure to the second endianness without using a byte swapping engine.

18. A computer to convert a file access data structure from a first endianness to a second endianness, comprising:

an operating system executing on the computer to determine if the file access data structure is a critical path data structure, where the critical path data structure includes commonly utilized data structures;

the computer performing byte swap operations using specific code functions in response to determining that the file access data structure is the critical path data structure, and holding a converted data structure in an output buffer to make the converted data structure available for further processing;

the computer calling a byte-swapping engine to perform the following in response to determining that the file access data structure is not the critical path data structure:
  a.) the byte-swapping engine executing a process to identify, from a descriptor look up table, a series of actions to perform on elements of the file access data structure; and
  b.) the byte-swapping engine to perform the identified series of actions on the elements of the file access data structure to convert the file data structure from the first endianness to the second endianness; and
  c.) a memory having an output buffer to hold a converted data structure in the output buffer to make the converted data structure available for further processing.

19. The computer as in claim 18, further comprising:

an operating system executing on the computer to use as the file access data structure a file having Direct Access File System (DAFS) protocol.

20. The computer as in claim 18, further comprising:

the critical path data structures are small data structures.

21. The computer of claim 18, further comprising:

the operating system to determine that the critical data path structure is a direct access file system (DAFS) header data structure.

22. The computer of claim 18, further comprising:

the operating system to determine to execute the specific code functions to rapidly convert any elements of the data structure to the second endianness without using a byte swapping engine.

23. The computer as in claim 18, further comprising:

the operating system executing on the computer to swap bytes of a file as needed, in response to swapping bytes of the file access data structure.

24. The computer as in claim 18, further comprising:
the operating system executing on the computer to determine if an element entry of the descriptor look up table is nested;
the operating system to branch to the nested entry;
the operating system to identify, from the descriptor look up table, a nested series of actions to perform on elements of the nested entry in order to swap bytes of the entry from a first endianness to a second endianness, where the nested series of actions includes linking and converting.

\* \* \* \* \*